March 2, 1954  E. D. WILKERSON  2,670,874

HYDRAULIC BRAKE SYSTEM BLEEDING AND FILLING APPARATUS

Filed Oct. 12, 1948

Inventor
Edward D. Wilkerson.

By
Mason, Porter, Diller & Stewart
ATTORNEYS

Patented Mar. 2, 1954

2,670,874

UNITED STATES PATENT OFFICE 2,670,874

HYDRAULIC BRAKE SYSTEM BLEEDING AND FILLING APPARATUS

Edward D. Wilkerson, Orange, N. J.

Application October 12, 1948, Serial No. 54,021

2 Claims. (Cl. 222—61)

1

The invention relates generally to hydraulic brake systems and primarily seeks to provide a novel hand apparatus which is simple and economical to manufacture and which is subject to use with great facility in the bleeding and filling of the fluid reservoirs and conduits employed in such brake systems.

It is well known that the hydraulic brake systems incorporated in automotive vehicles require certain servicing operations which include the refilling of the main reservoir as the fluid level becomes low, and the bleeding of the system when the braking action becomes inefficient as a result of the inclusion of air in the conduits. Under such conditions it is necessary to force the air from the conduits and fill the voids therein with brake fluid, and it is also essential to keep the reservoir and master cylinder full of brake fluid in order to prevent additional air from entering the system.

A well known method of bleeding hydraulic brake systems involves the removal of the filler cap of the reservoir and the replenishing of the braking fluid therein, the opening of a bleeder valve, and the pumping of the brake pedal in order to force air from and fluid into the valve opened circuit. Then when all air has been thus expelled from the particular conduit and the same is properly filled with the braking fluid, the particular bleeder valve is closed and the operation is repeated with respect to each of the remaining conduits. This method is unsatisfactory because of the considerable amount of labor involved and the time necessarily consumed in practicing the same. It is the purpose of the present invention to provide an exceedingly simple and inexpensively manufactured device for filling and bleeding hydraulic brake systems and which includes a small hand held reservoir for containing the braking fluid, a duct connectible with the master cylinder reservoir of the system and a duct attachable to an inflated tire of the automobile as a pressure source effective to force braking fluid from the hand held reservoir into the system for bleeding and filling the same.

Another object of the invention is to provide an apparatus of the character stated in which the fluid delivery duct includes a float valve which remains open so long as the hand held reservoir has braking fluid therein, and which closes to prevent introduction of air into the brake system when the supply of braking fluid in said reservoir becomes exhausted.

Another object of the invention is to provide an apparatus of the character stated in which the fluid delivery duct includes a check valve

2 effective to prevent inadvertent discharging of fluid from the apparatus when it is disconnected from the brake system and the air pressure source.

Still another object of the invention is to provide an apparatus of the character stated in which the air pressure duct attaching means includes a valve stem depresser for opening the valve of the tire to which said duct is connected and admitting air into the duct.

With the above and other objects in view that will hereinafter appear, the nature of the invention will be more clearly understood by reference to the following detailed description, the appended claims, and the several views illustrated in the accompanying drawing.

Figure 1:
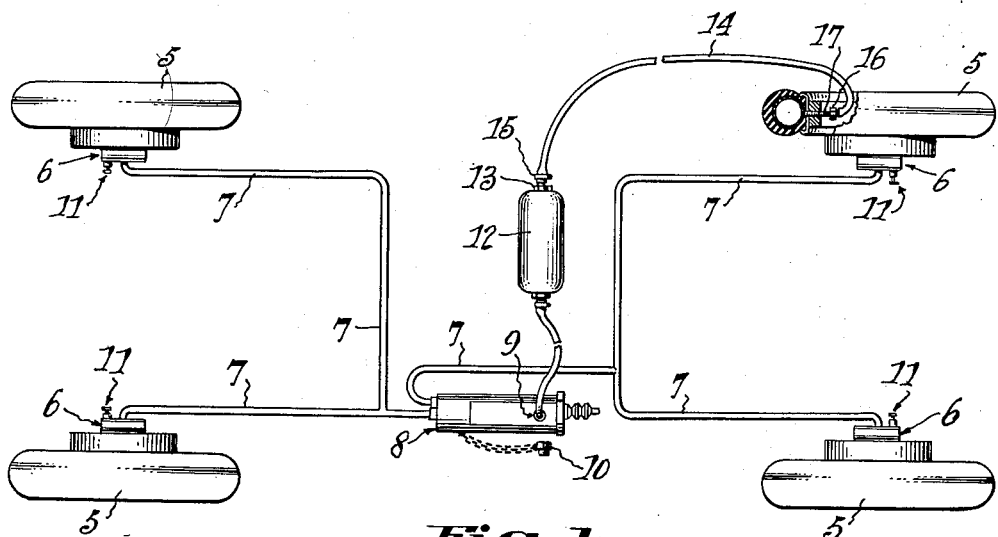
Figure 1 is a diagrammatic view illustrating the hydraulic brake system of an automotive vehicle with the device of the invention operatively attached thereto.

In the example of embodiment of the invention herein disclosed, the chassis of a wheeled vehicle having a hydraulic brake system is diagrammatically illustrated, the usual pneumatic tires on such chassis being indicated at 5, and the hydraulic braking unit being diagrammatically indicated at 6. The brake units 6 are connected through the usual conduits 7 with the usual cylinder and reservoir generally designated 8, this cylinder and reservoir being equipped with the usual filler mounting tap 9 which is normally closed by the removable screw plug 19. The individual bleeder valves of the respective braking units 6 are indicated at 11. All of the parts thus far described will be recognized as standard equipment and, in themselves, form no part of the present invention.

Figure 2:
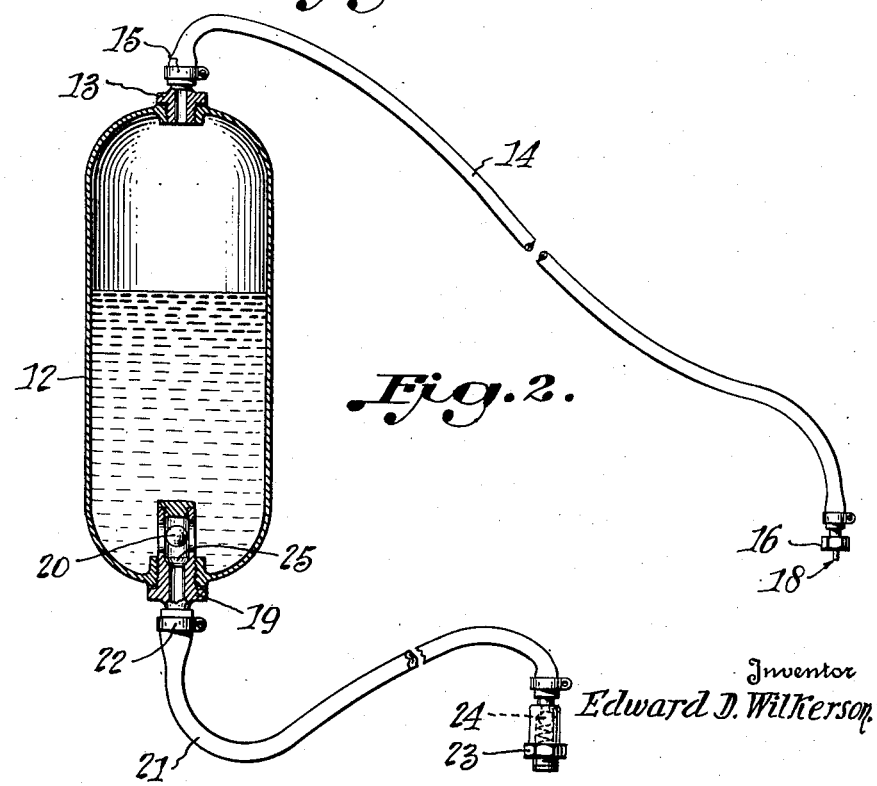
Figure 2 is a detail plan view illustrating the brake system filling and bleeding device, the reservoir being shown in central longitudinal section.

The improved brake system filling and bleeding device embodying the present invention is illustrated in detail in Figure 2 and this device is shown applied for use in the diagrammatic illustration in Figure 1. The device includes a reservoir 12 which need only be large enough to hold only about a quart of braking fluid, and thus it will be apparent that this device is subject to being readily held in the hand of an operator charged with the duty of filling and bleeding a brake system, or it may be conveniently rested upon the floor, or upon a suitable stand or other support during the filling and bleeding of a hydraulic brake system.

The reservoir 12 has a threadably mounted union 13 at one end to which a pressure duct 14 is connected as at 15. The duct 14 preferably takes the form of a flexible hose length which is equipped with a union 16 at its free end adapted to be threadably attached to the valve stem 17 of a tire in the manner illustrated in Figure 1. The threadably attachable union 16 is equipped with a suitable valve stem depresser 18 so that when it is attached to the tire valve stem in the manner illustrated in Figure 1 the depresser 18 will displace the tire valve plunger so as to permit the air under pressure within the respective inflated tire to rush into the conduit 14 and through the same into the reservoir 12.

The reservoir 12 is equipped at its other end with a fitting 19 having a float valve 20 therein and to which a fluid delivery duct 21 is secured as at 22. Like the duct 14, the fluid delivery duct 21 preferably takes the form of a flexible hose length, and said delivery duct is equipped at its free end with a fitting 23 which is threadably attachable to the tap 9 of a hydraulic braking system which is to be filled and bled. It will be noted by reference to Figure 2 that the threadably attachable fitting 23 is equipped with a check valve 24 which is effective to close the end of the delivery duct 21 against egress of fluid except when the fluid is being pressure expelled from said duct end.

When it is desired to fill and bleed the hydraulic braking system of an automotive vehicle such as is diagrammatically illustrated in Figure 1, the fitting 13 is removed from the reservoir and about a pint of braking fluid is introduced into said reservoir. The fitting 13 is replaced, and then the device illustrated in detail in Figure 2 is mounted in the manner illustrated in said Figure 1. That is, the closure plug 10 of the master cylinder and reservoir 8 is removed and the threadably attachable union 23 of the delivery duct 21 is secured to the tap 9, and then the threadably attachable fitting 16 of the pressure duct 14 is attached to the valve stem of a selected tire. The attachment of the pressure duct 14 to the inflated tire and the opening of the tire valve in the manner stated will result in the introduction of air under pressure of approximately 30 pounds per square inch into the top of the reservoir 12, and this air will force braking fluid from the reservoir 12 through the delivery duct 21 and the check valve 24 into the master cylinder and reservoir 8. By manipulation of the bleeder screws 11 in the usual manner the hydraulic braking system of the wheel can be filled and bled in the manner well known to workers in the art.

During the filling and bleeding of a braking system in the manner stated the selected tire serving as the pressure source will be deflated only to the extent of approximately 1 pound since the total capacity in the tire is much greater than the capacity of the air chamber above the braking fluid within the hand held or otherwise supported small reservoir 12.

It is to be understood that so long as there is braking fluid within the reservoir 12 the float valve 20 will remain out of contact with the seat 25 provided at the lower end of the fitting 19, but should the supply of braking fluid within the reservoir be exhausted, the float valve will engage the seat 25 and prevent the delivery of air through the duct 21 into the hydraulic braking system to which the device is attached.

The herein described hydraulic brake system filling and bleeding device presents marked advantages in the simplicity of its construction and the ease with which it can be handled. This device eliminates the necessity of providing expensive packed cylinder and piston structures which are subject to becoming gummed up and which necessitate the provision of expensive valves and packings, and it also eliminates the necessity of providing heavy reservoirs in which high pressures must be retained over long periods and which must be equipped with expensive pressure gages and safety valves. It is also known to workers in the art that in brake system filling and bleeding devices wherein high pressures are retained over long periods it is necessary to pump the pressure fluid into the cumbersome reservoirs and that the high pressure air tends to mix with the braking fluid and bring about inefficient filling and bleeding operations.

While one form of the invention has been shown for purposes of illustration, it is to be clearly understood that various changes in the details of construction and arrangement of parts may be made without departing from the spirit and scope of the invention as defined in the appended claims.

I claim:

1. A portable hydraulic brake system filling and bleeding apparatus comprising a reservoir of a size to receive a quantity of braking fluid to fill a braking system with air under pressure above said fluid, said reservoir being readily hand carried and supported, an elongated flexible pressure duct attached to and opening into said reservoir, a union member mounted on the free end of said duct and having means for removably attaching it to a tire inflated to a higher pressure than the pressure in said reservoir to receive air under pressure from said tire and deliver the same through the other end of the duct into the reservoir, a braking fluid delivery duct connected with the reservoir for receiving and delivering braking fluid from said reservoir under the pressure of the air delivered into the reservoir through said pressure duct, a union member mounted on the free end of said delivery duct and having means for removably attaching it to the master cylinder and reservoir of a hydraulic brake system, and automatic valve means effective to permit entry of braking fluid into the delivery duct so long as a supply of braking fluid remains in the reservoir and operable by pressure of air in said reservoir when empty of braking fluid to close the reservoir against the discharge of said air under pressure through the delivery duct into the braking system.

2. A portable hydraulic brake system filling and bleeding apparatus comprising a reservoir of a size to receive a quantity of braking fluid to fill a braking system with air under pressure above said fluid, said reservoir being readily hand carried and supported, an elongated flexible pressure duct attached to and opening into said reservoir, a union member mounted on the free end of said duct and having means for removably attaching it to a tire inflated to a higher pressure than the pressure in said reservoir to receive air under pressure from said tire and deliver the same through the other end of the duct into the reservoir, a braking fluid delivery duct connected with the reservoir for receiving and delivering braking fluid from said reservoir under the pressure of the air delivered into the reservoir through said pressure duct, a union member mounted on the free end of said delivery duct and having valved means for removably attaching it to the master cylinder and reservoir of a hydraulic brake system, and automatic valve means effective to permit entry of braking fluid into the delivery duct so long as a supply of braking fluid remains in the reservoir and operable by pressure of air in said reservoir when empty of braking fluid to close the reservoir against the discharge of said air under pressure through the delivery duct into the braking system.

EDWARD D. WILKERSON.

References Cited in the file of this patent

UNITED STATES PATENTS

| Number | Name | Date |
|---|---|---|
| 1,759,278 | Ritter | May 20, 1930 |
| 1,825,013 | Patton | Sept. 29, 1931 |
| 1,903,233 | Gille | Mar. 28, 1933 |
| 2,063,727 | Davis | Dec. 8, 1936 |
| 2,181,073 | Schafer | Nov. 21, 1939 |
| 2,237,559 | Jenne | Apr. 8, 1941 |
| 2,295,539 | Beach | Sept. 15, 1942 |